Patented Nov. 20, 1951

2,576,079

UNITED STATES PATENT OFFICE 2,576,079

ALKYLAMINOALKYL ESTERS OF ARYL URETHANS

John S. Pierce, Richmond, Va., assignor to University of Richmond, Richmond, Va.

No Drawing. Application February 14, 1950, Serial No. 144,199

7 Claims. (Cl. 260—472)

This application is a continuation in part of my co-pending applications filed April 12, 1947 (Serial number 740,989) and filed May 1, 1947 (Serial Number 745,249) now abandoned, both for Aryl Urethans.

This invention relates to a particular class of aryl urethans of unexpected pharmacological properties.

The principal object of this invention is to provide a series of compounds which have valuable pharmacological properties and particularly which are powerful local anesthetics.

These compounds are aryl urethans of 2-methyl-2-monoalkylamino-1-propanol and have the general formula $$RNHCOOCH_2C(CH_3)_2NHR'$$

where R is a member of the group phenyl, o-tolyl, p-tolyl, beta-naphthyl and alpha-naphthyl, and R' is an alkyl radical containing from three to ten carbons. These urethans are prepared by the interaction of the proper aryl isocyanates and amino alcohols. A convenient method of preparation is given in the illustrative examples. The aryl isocyanate is caused to react with the hydrochloride of the amino alcohol, both being dissolved in chloroform. The method of preparation, however, is not limited to the one given in the following examples as this is for illustrative purposes only and other methods of urethan formation will occur to those persons skilled in the art.

Most of the urethans are obtained as solids. All of the urethans form salts with acids. Melting points and chloride analyses are given herein for the hydrochlorides of representative urethans; and melting points and nitrogen analyses are given for the free bases of several of the urethans. Representative urethans were found to be more soluble as the hydrochlorides, phosphates, acetates and lactates than as the free bases.

Herein are disclosed data on the anesthetic action of typical urethans, taken with aqueous solutions of the hydrochlorides of the urethans. Other solvents, as for example, propylene glycol, were found to dissolve typical urethan hydrochlorides. Representative free bases were found to be soluble in propylene glycol and non-polar solvents as for instance olive oil, peanut oil and sesame oil.

Standard procedure was used for the preparation of the urethans (see Cope and Hancock, J. Am. Chem. Soc. 66, 1452 (1944)). This is shown by the following illustrative examples:

EXAMPLE 1

2 - methyl - 2 - mono - n - propylaminopropyl alpha-naphthyl urethan hydrochloride In 80 m. of chloroform were dissolved 26.2 grams (0.20 mole) of freshly distilled 2-methyl-2-mono-n-propylamino-1-propanol. The solution was saturated with dry hydrogen chloride. A heavy precipitate, likely the amino alcohol hydrochloride, was formed. The mixture was transferred to a glass tube and 33.8 grams (0.20 mole) of alpha-naphthyl isocyanate and 20 ml. of chloroform were added. The tube was sealed and heated for 15 hours at 100° C. Upon opening the cooled tube, considerable pressure was noted. The contents of the tube were heated with approximately 800 ml. of water until the chloroform was boiled off. The mixture was filtered with suction. The filtrate was made basic. Considerable oil came out of solution. This oil was extracted with 200 ml. of ether. The ether solution was filtered into 200 ml. of 2 N hydrochloric acid and stirred. A crystalline solid started to come out of solution almost immediately. The solid, 2 - methyl - 2 - mono - n - propylaminopropyl alpha-naphthyl urethan hydrochloride, was dissolved in a small amount of alcohol and poured into a basic solution. The oil coming out of solution was dissolved in ether and again filtered into a solution of hydrochloric acid. Again the crystalline urethan hydrochloride was obtained. Melting point, 232-233° C.

In some runs the contents of the tubes were treated with a large excess of hydrochloric acid solution and the urethan hydrochloride precipitated out, leaving very little in solution.

In some cases the urethans were obtained as crystalline hydrochlorides by dissolving the free bases in isopropyl ether and by saturation with dry hydrogen chloride. The hydrochlorides were purified by recrystallization from 95 percent alcohol, from acetone and alcohol and from acetone and petroleum ether.

The free bases, for the melting point determinations and for the nitrogen analyses, were prepared from the purified hydrochlorides. These were dissolved in hot water and precipitated by making the solution basic or by solution in hot alcohol and by pouring into sodium hydroxide solution. Usually, the free bases were obtained by extraction with ether and evaporation of the ether.

In Table I are given the melting points and chlorine analyses of typical urethan hydrochlorides and melting points and nitrogen analyses of several corresponding free bases.

TABLE I

*Aryl urethans of 2-methyl-2-monoalkylamino-1-propanols*

[RNHCOOCH₂C(CH₃)₂NHR']

| No. | R | R' | M. P.,[1] °C. | Nitrogen, Caled. | Per Cent Found | Hydrochlorides M. P.,[1] °C. | Chlorine, Per Cent Caled. | Chlorine, Per Cent Found |
|---|---|---|---|---|---|---|---|---|
| 1 | Phenyl | n-Propyl | 78.5-80 | 11.19 | 11.40 | 206 -207 | 12.36 | 12.31 |
| 2 | do | n-Butyl | 59.5-61 | 10.60 | 10.55 | 189 -190 | 11.79 | 11.79 |
| 3 | do | n-Amyl | 43.5-46 | 10.06 | 9.80 | 183 -184 | 11.26 | 11.39 |
| 4 | do | n-Hexyl | oil | 9.58 | 9.52 | 162 -163.5 | 10.78 | 10.73 |
| 5 | do | n-Heptyl | oil | 9.14 | 9.07 | 156 -157 | 10.34 | 10.39 |
| 6 | do | iso-Amyl | 77 -78 | 10.06 | 10.28 | 191.5-192 | 11.26 | 11.15 |
| 7 | α-Naphthyl | n-Propyl | 68 -70.5 | 9.33 | 9.63 | 232 -233 | 10.53 | 10.39 |
| 8 | do | n-Butyl | 92.5-93.5 | 8.91 | 8.94 | 223.5-225 | 10.11 | 9.94 |
| 9 | do | n-Amyl | 63.5-64.5 | 8.53 | 8.61 | 212 -213.5 | 9.72 | 9.73 |
| 10 | do | n-Hexyl | 78 -79.5 | 8.18 | 7.95 | 213 -214.5 | 9.36 | 9.39 |
| 11 | do | n-Heptyl | 60 -62 | 7.86 | 7.73 | 196.5-198 | 9.02 | 9.12 |
| 12 | o-Tolyl | n-Propyl | | | | 193.5-194 | 11.79 | 11.62 |
| 13 | β-Naphthyl | n-Amyl | | | | 193 -195 | 9.72 | 9.69 |
| 14 | o-Tolyl | do | | | | 220 -224 | 10.78 | 10.55 |
| 15 | do | n-Hexyl | | | | 170 -172 | 10.32 | 10.19 |
| 16 | p-Tolyl | n-Heptyl | | | | 181 -184 | 9.94 | 9.74 |
| 17 | β-Naphthyl | n-Decyl | | | | 175 -176 | 8.15 | 8.39 |
| 18 | p-Tolyl | do | | | | 185 -186 | 8.84 | 8.87 |
| 19 | Phenyl | do | | | | 168 -172 | 9.17 | 9.20 |

[1] The melting points given are for purposes of identification of the compounds prepared and any slight discrepancies which may occur between the values in this table and values which may be reported later do not vitiate the claims.

In addition to the compounds listed in Table I, compounds of the structure

RNHCOOCH₂C(CH₃)₂NHR'.HCl were prepared, made up of the following combinations:

| R | R' |
|---|---|
| beta-Naphthyl | n-Propyl. |
| p-Tolyl | Do. |
| Do | n-Amyl. |
| beta-Naphthyl | n-Hexyl. |
| Do | n-Heptyl. |
| o-Tolyl | Do. |
| Do | n-Decyl. |
| alpha-Naphthyl | Do. |

Method of testing anesthetic action

The urethans, as the hydrochlorides, were tested as local anesthetic agents against cocaine hydrochloride by measuring their ability to suppress the corneal reflex of the rabbit eye.

After preliminary trials at various dilutions, the urethan hydrochlorides were used at a concentration of 0.1 per cent in each case and the cocaine hydrochloride was at 1.0 percent concentration. The right eye of each rabbit received 5 drops of the urethan hydrochloride solution and after three minutes was washed thoroughly. The left eye was treated similarly with cocaine hydrochloride. The corneal reflex was tested at regular intervals and was recorded as −, ±, + or ++. Observations also were made on pupillary size, occurrence of edema, inflammation and corneal pitting for several of the compounds. The ratio of time of anesthesia for the urethan to the time for cocaine was multiplied by 10 to give the "anesthetic potency," this factor being used to correct for the difference in concentration.

In Table II are given data on tests, as described just above, with several typical urethan hydrochlorides.

TABLE II

*Tests with hydrochlorides of aryl urethans of 2-methyl-2-monoalkylamino-1-propanol*

[RNHCOOCH₂C(CH₃)₂NHR'.HCl]

| Compound No. | R | R' | Anesthetic[1] Potency (x cocaine hydrochloride) | Inflammation | Pitting |
|---|---|---|---|---|---|
| 1 | Phenyl | n-Propyl | 10 | None | None. |
| 2 | do | n-Butyl | 12 | Slight | Slight. |
| 3 | do | n-Amyl | 13 | Slight | Do. |
| 4 | do | n-Hexyl | 14 | Moderate | Do. |
| 5 | do | n-Heptyl | 34 | Slight | Do. |
| 6 | do | iso-Amyl | 17 | Very slight | None. |
| 7 | α-Naphthyl | n-Propyl | 4.5 | None | Do. |
| 8 | do | n-Butyl | 20 | Slight | Slight. |
| 9 | do | n-Amyl | 34 | None | Do. |
| 10 | do | n-Hexyl | 31 | None | Do. |
| 11 | do | n-Heptyl | 38 | Slight | Do. |

[1] The urethan hydrochlorides were used at a concentration of 0.1 percent and were compared with cocaine hydrochloride in 1.0 percent concentration as is described above.

All but one of the urethans reported were shown to possess local anesthetic power equal to or greater than the standard; since the standard solution was 10 times the concentration of the test solution, it indicates anesthetic potency for all but one of the new local anesthetics of from 10 to 38 times that of cocaine.

In general there is an inverse correlation between solubility of the substance in water and its anesthetic action, the more difficultly soluble drugs being more effective.

The occurrence of side reactions is given for several compounds in Table II. No edema occurred with any of these compounds. Pupillary size was increased very slightly with compounds Nos. 2 and 4. Cocaine hydrochloride in 1.0 per cent solution by comparison caused marked pupillary dilation in all cases, some pitting of the corneal surface and some inflammation but no edema.

In addition to the data given in Table II, anesthetic potencies of 12, 12, 10, 12 and 20 respectively were obtained with the hydrochlorides of 2 - methyl - 2 - mono-n-propylaminopropyl beta-naphthyl urethan, 2-methyl-2-mono-n-propylaminopropyl p-tolyl urethan, 2-methyl-2-mono-n-amylaminopropyl o-tolyl urethan, 2-methyl-2-mono-n-hexylaminopropyl beta-naphthyl urethan and 2-methyl-2-mono-n-hexylaminopropyl p-tolyl urethan.

It is recognized that the data on anesthetic action is based on an arbitrary method but this method likely is the one most frequently used. After making allowances for limitations in the method, it is evident that the particular structure of the class of compounds herein described imparts to these products some peculiar and unexpectedly powerful local anesthetic action. The high value assigned to most of the members in Table II indicates that most of these products have good potentialities as local anesthetics and the extremely high activity of some of the members, coupled with the solubility of the free bases in various oils, indicates particular usefulness for these members.

I claim:

1. As new compounds, aryl urethans of the structure

and acid salts thereof, where R is a member of the group consisting of phenyl and alpha-naphthyl and R' is an alkyl radical of from three to seven carbons.

2. As new compounds, hydrochlorides of the structure

RNHCOOCH₂C(CH₃)₂NHR'·HCl where R is a member of the group consisting of phenyl and alpha-naphthyl and R' is an alkyl radical of from three to seven carbons.

3. As a new compound,

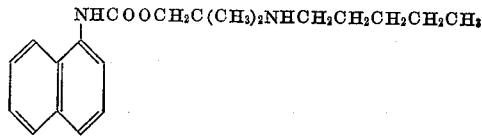

4. As new compounds, acid salts of the compound of claim 3.

5. As a new compound,

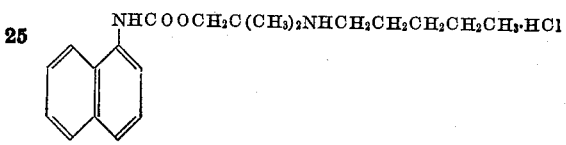

6. As a new compound,

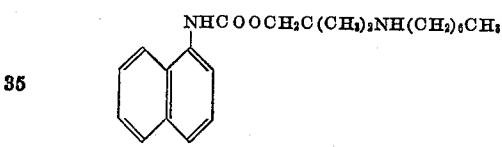

7. As new compounds, acid salts of the compound of claim 6.

JOHN S. PIERCE.

REFERENCES CITED

The following references are of record in the file of this patent:

Cope et al., J. Am. Chem. Soc., 66, 1448–1453 (1944).